(12) United States Patent
Duan et al.

(10) Patent No.: US 11,876,406 B2
(45) Date of Patent: Jan. 16, 2024

(54) DIRECT CONTACT COOLING OF AXIAL FLUX MOTOR STATOR

(71) Applicant: GM GLOBAL TECHNOLOGY OPERATIONS LLC, Detroit, MI (US)

(72) Inventors: Chengwu Duan, Shanghai (CN); Jian Yao, Shanghai (CN); Alireza Fatemi, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 311 days.

(21) Appl. No.: 17/489,552

(22) Filed: Sep. 29, 2021

(65) Prior Publication Data

US 2022/0166268 A1 May 26, 2022

(30) Foreign Application Priority Data

Nov. 26, 2020 (CN) .......................... 202011347171.3

(51) Int. Cl.
*H02K 21/24* (2006.01)
*H02K 1/20* (2006.01)
(Continued)

(52) U.S. Cl.
CPC .................. *H02K 1/20* (2013.01); *H02K 1/14* (2013.01); *H02K 9/19* (2013.01); *H02K 15/022* (2013.01); *H02K 21/24* (2013.01)

(58) Field of Classification Search
CPC ............ H02K 21/24; H02K 1/14; H02K 1/02; H02K 1/148; H02K 1/2713; H02K 3/521; H02K 9/19
See application file for complete search history.

(56) References Cited

U.S. PATENT DOCUMENTS 6,894,413 B2 5/2005 Nakano et al.
7,692,357 B2 4/2010 Qu et al.
(Continued)

FOREIGN PATENT DOCUMENTS

CN 112821702 A 5/2021
DE 202004019482 U1 4/2006
(Continued)

OTHER PUBLICATIONS

DE-202004019482-U1 machine translation Oct. 2, 2023.*
(Continued)

*Primary Examiner* — Leda T Pham
(74) *Attorney, Agent, or Firm* — Harness, Dickey & Pierce, P.L.C.

(57) ABSTRACT

A stator assembly for an axial flux motor includes a heat exchanger jacket configured to circulate a heat transfer liquid. A stator also includes a plurality of stator cores each having a conductive winding, an electrically insulating material disposed over at least a portion of the conductive wire winding, and a molded soft magnetic composite (SMC) material. The heat exchanger jacket is disposed circumferentially around at least a portion of a perimeter of the stator. Each stator core defines a peripheral surface configured to contact the heat exchanger jacket and at least a portion of the peripheral surface is defined by the molded soft magnetic composite (SMC) material. Methods of making a molded soft magnetic composite (SMC) material stator core are also provided.

20 Claims, 5 Drawing Sheets

(51) Int. Cl.
  *H02K 1/14*   (2006.01)
  *H02K 15/02*  (2006.01)
  *H02K 9/19*   (2006.01)

(56) References Cited

U.S. PATENT DOCUMENTS

| | | | |
|---|---|---|---|
| 8,466,592 | B2 | 6/2013 | Atallah et al. |
| 9,742,225 | B2 | 8/2017 | Klassen et al. |
| 9,755,463 | B2 | 9/2017 | Klassen et al. |
| 9,882,518 | B2 | 1/2018 | McLean |
| 9,917,484 | B2 | 3/2018 | Aoyama |
| 9,963,185 | B2 | 5/2018 | Neugebauer et al. |
| 10,291,086 | B2 | 5/2019 | Deak et al. |
| 10,879,754 | B2 | 12/2020 | Yao et al. |
| 11,025,116 | B2 | 6/2021 | Yao et al. |
| 2005/0127769 | A1 | 6/2005 | Minagawa |
| 2012/0126652 | A1 | 5/2012 | Shah et al. |
| 2014/0285048 | A1 | 9/2014 | Seo et al. |
| 2017/0025927 | A1* | 1/2017 | Weerts ............... H02K 3/24 |
| 2019/0097499 | A1* | 3/2019 | Yim ............... H02K 3/24 |
| 2019/0273406 | A1 | 9/2019 | Gehlert et al. |
| 2019/0283972 | A1 | 9/2019 | Yasinski |
| 2019/0288571 | A1 | 9/2019 | Lehikoinen et al. |
| 2019/0288584 | A1 | 9/2019 | Vansompel et al. |
| 2019/0363598 | A1 | 11/2019 | Coppola et al. |
| 2020/0106351 | A1 | 4/2020 | Sozer |
| 2020/0251946 | A1 | 8/2020 | Yao et al. |
| 2020/0274410 | A1 | 8/2020 | Yao et al. |
| 2021/0143700 | A1 | 5/2021 | Yao et al. |
| 2021/0152040 | A1 | 5/2021 | Yao et al. |
| 2021/0152041 | A1 | 5/2021 | Duan et al. |

FOREIGN PATENT DOCUMENTS

| | | | | |
|---|---|---|---|---|
| DE | 202004019482 | U1 * | 5/2006 | ........... H02K 1/2793 |
| DE | 102020127447 | A1 | 5/2021 | |
| DE | 112019006435 | T5 | 9/2021 | |
| EP | 3012944 | A1 | 4/2016 | |
| EP | 1416254 | B1 | 2/2017 | |

OTHER PUBLICATIONS

First Office Action for German Patent Application No. 10 2021 114 085.4 dated Mar. 2, 2022, with correspondence dated Mar. 28, 2022, from Manitz Finsterwald Patent- und Rechtsanwaltspartnerschaft mbB; 8 pages.

Wang et al; "Field-Weakening Performance Improvement of the Yokeless and Segmented Armature Axial Flux Motor for Electric Vehicles"; Energies 2017, 10, 1492; http://www.mdpi.com/journal/energies (12 pages).

Huang et al; "A New Axial Flux Surface Mounted Permanent Magnet Machine Capable of Field Control"; Wisconsin Power Electronics Research Center and National Science Foundation of China; 0-7803-7420-7/02/ © 2002 IEEE; pp. 1250-1257.

Wang et al; "Transparent Perfect Microwave Absorber Employing Asymmetric Resonance Cavity"; Adv. Sci. 2019, 6, 1901320; © 2019 The Authors. Published by WILEY-VCH Verlag GmbH & Co. KGaA, Weinheim; www.advancedscience.com; (9 paes).

Yao, Jian et al., U.S. Appl. No. 16/426,797, filed May 30, 2019 entitled, "Centrifugal Fluid-Cooled Axial Flux Motor," 32 pages.

Clemens, Kevin, "A New Generation of Axial Flux EV Motors," Electric & Hybrid Vehicle Technology Expo—Novi, Michigan, May 21, 2018 [retrieved on Dec. 11, 2019]. Retrieved from the Internet: <URL: https://www.designnews.com/content/new-generation-axial-flux-ev-motors/186519862158706>, 4 pages.

Hannon, Bert et al., "Time- and Spatial-Harmonic Content in Electrical Machines and its Applicationin Fourier-Based Models," 2016 XXII International Conference on Electrical Machines (ICEM), Sep. 4-7, 2016; DOI: 10.1109/ICELMACH.2016.7732586.

Moreels, Daan, "Axial Flux vs Radial Flux: 4 Reasons why Axial Flux Machines have a Higher Power Density," Magnax, Jan. 31, 2018 [retrieved on Dec. 11, 2019]. Retrieved from the Internet: <URL: https://www.magnax.com/magnax-blog/axial-flux-vs-radial-flux.-4-reasons-why-does-axial-flux-machines-deliver-a-higher-power-density>, 12 pages.

Moreels, Daan, "Axial-Flux Motors and Generators Shrink Size, Weight," Power Electronics, Jul. 13, 2018, [retrieved on Dec. 11, 2019]. Retrieved from the Internet: <URL: https://www.powerelectronics.com/automotive/axial-flux-motors-and-generators-shrink-size-weight>, 13 pages.

Park, Jae-Do et al., "Analysis and Reduction of Time Harmonic Rotor Loss in Solid-Rotor Synchronous Reluctance Drive," IEEE Transaction on Power Electronics, vol. 23, No. 2 (Mar. 2008); DOI: 10.1109/TPEL.2007.91522.

* cited by examiner

DIRECT CONTACT COOLING OF AXIAL FLUX MOTOR STATOR

CROSS-REFERENCE TO RELATED APPLICATIONS

This application claims the benefit and priority of Chinese Application No. 202011347171.3, filed Nov. 26, 2020. The entire disclosure of the above application is incorporated herein by reference.

INTRODUCTION

This section provides background information related to the present disclosure which is not necessarily prior art.

The present disclosure relates generally to stators for axial flux motors, and more specifically, stators having a magnetic core component designed to enhance heat transfer with an adjacent heat exchanger component.

Electric motors convert electrical energy into mechanical work by the production of torque. Electric vehicles, including hybrid vehicles, employ electric motors, such as induction motors and permanent magnet motors, to propel the vehicles, as well as to capture braking energy when acting as an electric generator. Generally, the electric motor includes a rotor that rotates during operation and a stator that is stationary. The rotor may contain a plurality of permanent magnets and rotates relative to the fixed stator. The rotor is connected to a rotor shaft that also rotates with the rotor. The rotor, including the permanent magnets, is separated from the stator by a predetermined air gap.

The stator includes conductors in the form of wire windings. When electrical energy is applied through the conductive wire windings, a magnetic field is generated. When electric energy or power is fed into the conductive windings of the stator, the power can be transferred over the air gap (between the stator and rotor) by a magnetic flux creating torque that acts on the permanent magnets in the rotor. In this manner, mechanical power can be transferred to or extracted from the rotating rotor shaft. In an electric vehicle, the rotor thus transmits torque via the rotating shaft through a gear set to the drive wheels of the vehicle.

Two common types of electric motors include radial flux or axial flux type motors. In a radial flux motor, the rotor and stator are typically situated in a concentric or nested configuration, so that when a stator is energized, it creates a magnetic flux that extends radially from the stator to the rotor. Thus, the conductive windings in the stator are typically arranged perpendicular to an axis of rotation so that a magnetic field is generated that is oriented in the radial direction from the axis of rotation (along the rotor shaft). In an axial flux motor, a magnetic field parallel to an axis of rotation is produced by the electrically conductive wire windings in the stator, so the magnetic flux extends parallel to an axis of rotation (parallel to the rotor shaft). In certain applications, axial flux motors are desirable because they are relatively lightweight, generate increased power, and have a compact size as compared to radial flux motors.

Operation of electric motors generates heat due to electrical resistance, iron losses, and mechanical frictions in the rotor(s) and stator(s). The stators and rotors are typically cooled to avoid overheating, which would result in demagnetization of the magnets and/or heat damage to the stators, rotors, and other motor components. For radial flux motors, external liquid cooling jackets are used to dissipate heat from the motors. However, for axial flux motors, especially for axial flux motors having a stator disposed between two external rotors, external liquid cooling jackets are not as efficient in dissipating heat, without compromising the compact form factor of the axial flux motor. Therefore, external cooling jackets are often avoided for axial flux motors. Instead, many conventional axial flux motors rely on internal fan blades/heat exchange fins incorporated on the external surfaces of the rotors for air-cooling. However, the motor efficiency can be diminished due to windage loss resulting from air-cooling. Thus, while air-cooled axial flux motors achieve their intended purpose, it would be desirable to have more efficient cooling of axial flux motors, while maintaining the desired compact form factor.

SUMMARY

This section provides a general summary of the disclosure, and is not a comprehensive disclosure of its full scope or all of its features.

The present disclosure relates to a stator assembly for an axial flux motor. In certain variations, the stator assembly includes a heat exchanger jacket configured to circulate a heat transfer liquid and a stator. The stator includes a plurality of stator cores. Each stator core includes a conductive winding, an electrically insulating material disposed over at least a portion of the conductive wire winding, and a molded soft magnetic composite material. The heat exchanger jacket is disposed circumferentially around at least a portion of a perimeter of the stator. Each stator core defines a peripheral surface configured to contact the heat exchanger jacket and at least a portion of the peripheral surface is defined by the molded soft magnetic material.

In one aspect, a first portion of the peripheral surface is defined by the molded soft magnetic material and a second portion of the peripheral surface is defined by the electrically insulating material.

In one further aspect, the second portion is a central region of the peripheral surface and the first portion defines at least two outer regions of the peripheral surface.

In one further aspect, the molded soft magnetic material defines at least one central recessed region configured to receive the conductive wire winding. The electrically insulating material is disposed on the conductive wire winding and the molded soft magnetic material defines protruding flanges on either side of the at least one central recessed region.

In one alternative aspect, the first portion is a central region of the peripheral surface and the second portion defines at least two outer regions of the peripheral surface.

In one further aspect, the molded soft magnetic material extends between adjacent stator cores of the plurality of stator cores. Thus, the stator has a yoked design.

In one aspect, the peripheral surface is defined by the molded soft magnetic (SMC) material having a gap disposed therein.

In one further aspect, the gap is centrally disposed within the peripheral surface.

In one further aspect, the molded soft magnetic material defines a recess beneath the peripheral surface that receives the conductive wire winding and the electrically insulating material disposed therein.

In one aspect, the plurality of stator cores are physically separated from one another. Thus, the stator has a yokeless design.

In one aspect, the molded soft magnetic material defines a core having at least one recessed region configured to receive the conductive wire winding and the electrically insulating material disposed thereon.

In one further aspect, the molded soft magnetic material has a first density in a central region of greater than or equal to about 7.4 kg/m$^3$ and the molded soft magnetic material at the peripheral surface has a second density of greater than or equal to about 7.0 kg/m$^3$ to less than or equal to about 7.4 kg/m$^3$.

In one aspect, the soft magnetic composite material a plurality of magnetic particles including iron.

In one aspect, the electrically insulating material is selected from the group consisting of epoxy, glass, porcelain, silicone rubber, ethylene propylene diene monomer rubber (EPDM), composites, and combinations thereof.

In one aspect, an axial flux motor includes the stator assembly described above and at least one rotor including a plurality of magnets and an air gap is defined between the stator and the at least one rotor.

The present disclosure also relates to a method of making a stator core component for an axial flux motor. In certain variations, the method may include introducing a soft magnetic composite material (SMC) precursor into a cavity of a mold including a first region and a second region. The soft magnetic composite material (SMC) precursor includes a polymer precursor and a plurality of magnetic or ferromagnetic particles. The method also includes compressing the soft magnetic composite material (SMC) precursor in the cavity by concurrently applying a first pressure of greater than or equal to about 800 MPa from a first press head in the first region and a second pressure of greater than or equal to about 300 MPa to less than or equal to about 600 MPa from a second press head in the second region. Then, a consolidated soft magnetic composite (SMC) material component is removed from the cavity. The consolidated soft magnetic composite (SMC) material component has a first density corresponding to the first region where the first pressure is applied and a second density corresponding to the second region where the second pressure is applied.

In one aspect, two consolidated soft magnetic composite (SMC) material components are joined together to form a stator core and the method further includes applying a conductive winding around the stator core and disposing an electrically insulating material over at least a portion of the conductive wire winding.

In one aspect, the plurality of magnetic or ferromagnetic particles includes a core of a magnetic or ferromagnetic material surrounded by a shell including one or more insulation layers. The magnetic or ferromagnetic material includes a material selected from the group consisting of: iron, samarium, neodymium, cobalt, aluminum, alloys and combinations thereof.

In one aspect, the first density is greater than or equal to about 7.4 kg/m$^3$ and the second density is greater than or equal to about 7.0 kg/m$^3$ to less than or equal to about 7.4 kg/m$^3$.

The present disclosure further relates to a stator assembly for a yoked axial flux motor including a heat exchanger jacket configured to circulate a heat transfer liquid. The stator assembly also includes a stator including a plurality of stator cores. Each stator core includes a conductive winding, an electrically insulating material disposed over at least a portion of the conductive wire winding, and a magnetic region including a molded soft magnetic composite material or a plurality of laminated magnetic steel layers. The magnetic region includes a centrally protruding portion that extends between and connects the plurality of stator cores. The heat exchanger jacket is disposed circumferentially around at least a portion of a perimeter of the stator. Each stator core defines a peripheral surface configured to contact the heat exchanger jacket and at least a portion of the peripheral surface is defined by the magnetic region.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
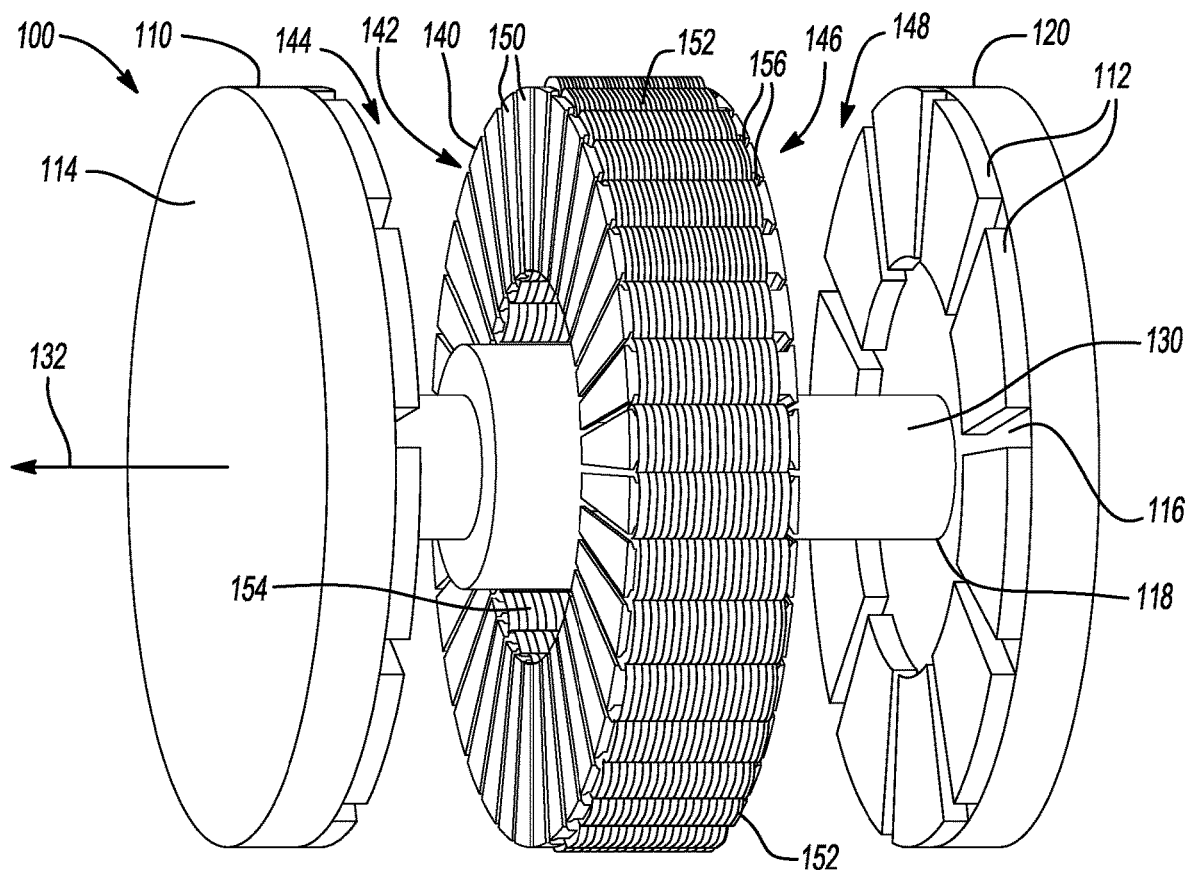
FIG. 1 shows a representative axial flux motor having one central stator and two rotors.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure pertains to an axial flux motor having improved cooling efficiency, such as a liquid cooled axial flux motor. As background, a non-limiting example of an electric device in the form of an axial flux motor 100, also known as a pancake motor, is shown in FIG. 1. The motor 100 has a first rotor 110 and a second rotor 120 both connected to and configured to rotate about a rotor shaft 130. Both the first and second rotors 110, 120 have an annular or disk shape with a centrally disposed aperture 118. The rotor shaft 130 passes through the centrally disposed aperture 118. The rotor shaft 130 defines a rotational axis 132 about which the rotor turns.

A stator 140 is disposed between the first rotor 110 and the second rotor 120. The stator 140 may have an annular or disk shape. The stator 140 is fixed and stationary, while the first and second rotors 110, 120 rotate during operation on the rotor shaft 130. The first rotor 110 faces a first side 142 of the stator 140 and defines a first air gap 144 therebetween. The second rotor 120 faces a second side 146 of the stator 140 and defines a second air gap 148 therebetween.

Although motor 100 is shown to have a central single stator 140 and two external rotors 110, 120, as appreciated by those of skill in the art, other configurations are also contemplated, including those having two stators and a single rotor or where the electric motor assembly may include more or fewer rotors and/or stators and that the description herein also applies to these other embodiments. Further, although not currently shown, the skilled artisan will appreciate that in various aspects, electric motor assemblies may further include a housing and the rotors and stators and shaft may be disposed within the housing. In certain aspects, the housing may be fixed to a vehicle frame and the shaft may be coupled to a gearbox, for example a reduction gearbox, within the vehicle.

Each of the first rotor 110 and the second rotor 120 can have the same design (facing in opposite directions towards the stator 140) and thus the common components will be described herein. Each of the first rotor 110 and second rotor 120 includes a plurality of permanent magnets 112 affixed to a rotor body 114. The permanent magnets 112 may have alternating polarity. Each permanent magnet 112 defines a channel 116 therebetween, which may extend radially along a face of the respective rotor. In this manner, the permanent magnets 112 and the channel 116 can together define a plurality of magnetic poles.

The stator 140 includes a plurality of stator segments or core components 150 about which a plurality of electrically conductive wire windings 152 are wrapped. The stator 140 defines a plurality of slots 156 between respective stator core components 150, where the conductive wire windings 152 may extend over or bridge the slots 156. The stator 140 may be fixed and stationary. Although not illustrated, other winding configurations and technologies as understood in the art are also contemplated. For example, in certain aspects, the slots 156 may be configured to receive the plurality of electrically conductive wire windings 152, which are wound in and through the slots 156. The conductive wire windings 152 may comprise copper or copper alloys.

Rotor shaft 130 may pass through a centrally disposed aperture 154 in the stator 140 and be supported by bearings that align the rotors 110, 120 with respect to the stator 140 while allowing rotation of the rotor shaft 130. As noted above, the plurality of electrically conductive wire windings 152 of the stator 140 may be formed of copper or other conductive wires configured to generate a magnetic field when current is applied so as to interact with magnetic fields of the plurality of permanent magnets 112 having alternating poles located on the first and second rotors 110, 120. Different regions of the stator 140 may be selectively energized to impart a rotational force on the first and second rotors 110, 120 causing the rotors 110, 120 and the rotor shaft 130 to rotate with respect to the rotational axis 132. The axial flux motor 100 having a single stator 140 and first and second rotors 110, 120 is capable of use in high torque applications, including for use in an electric or hybrid vehicle. In such a variation, a housing encasing the motor 100 may be attached to the vehicle frame and at least one output from an end of the rotor shaft 130 is coupled to a reduction gearbox or directly to the vehicle drive wheels. The vehicle application of the axial flux motor 100 is provided as an exemplary embodiment and is not intended to be limiting.

Figure 2:
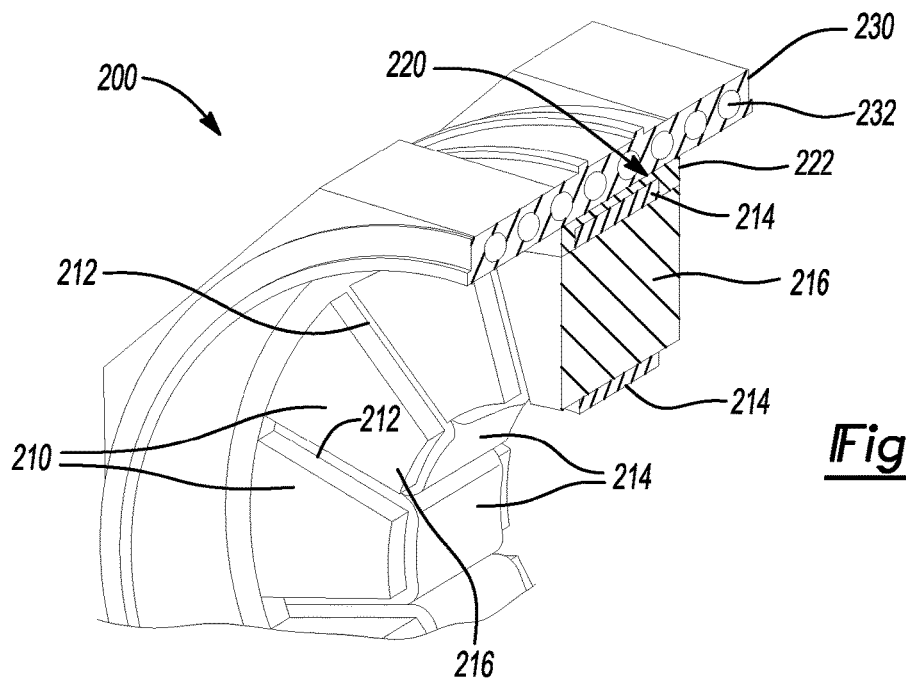
FIG. 2 is a partial sectioned view of an axial flux motor stator having a yokeless design and a heat exchanger jacket for heat transfer from stator core components.

FIG. 2 shows a sectional view of a conventional yokeless stator core design. A stator 200 includes a plurality of stator cores 210 physically separated by a plurality of channels or slots 212. A plurality of electrically conductive wire windings 214 are wrapped around each respective stator core 210. Each stator core 210 defines a central magnetic region 216 that may be formed of a magnetic or ferromagnetic material, such as a laminated steel structure (a laminated stator core central region having a plurality of layers of ferromagnetic material, such as magnetic steel) or a soft magnetic composite material. The stator 200 is a yokeless design in that the plurality of stator cores 210, especially the central magnetic regions 216, are not yoked together via physical connections between stator cores 210, but rather are entirely separated by the slots 212.

A peripheral surface configured for contacting an adjacent component or a peripheral contact surface 220 is defined by each of the plurality of stator cores 210. Each of the electrically conductive wire windings 214 are encased on three of four sides by an electrically insulating material 222, such as an epoxy material. Other insulating materials may include glass, porcelain or polymeric composite materials, for example, where a central region (e.g., rod) is made of fiber-reinforced plastic and an outer sheath comprises silicone rubber or ethylene propylene diene monomer rubber (EPDM). By encasing the conductive wire windings 214 in an electrically insulating material 222, select surrounding regions of the stator 200 are protected from the electrical current or potential in the conductive wire windings 214, while the central magnetic regions 216 of the stator cores 210 remain exposed to the conductive wire windings 214 to induce a magnetic field therein. In a conventional design like that shown, the electrically insulating material 222 defines the peripheral contact surface 220.

A heat exchanger component in the form of a heat exchanger jacket 230 is disposed adjacent to the peripheral contact surface 220 and thus is disposed along at least a portion of the circumference of the stator 200. The heat exchanger jacket 230 may be formed of a thermally conductive material, such as a metal, and further has a plurality of internally disposed cooling channels 232 through which a liquid/fluid heat transfer medium can be circulated. A suitable heat transfer medium may comprise water. The heat transfer medium may be circulated by pumping equipment (not shown).

As noted above, an axial motor delivers high torque density because of its axial flux topology and generates significant amounts of heat. However, it is hard to cool the segmented stator having a concentrated winding, because direct contact of the water jacket with the heat generating portions of the stator core does not occur. For example, in the design shown in FIG. 2, the peripheral contact surface 220 is formed of the electrically insulating material 222, which typically has a very low thermal conductivity. For example, an epoxy material may have a heat conductivity of about 0.35 w/m·K. Thus, the amount of heat transfer and cooling occurring between the plurality of stator cores 210 through the peripheral contact surface 220 to the heat exchanger jacket 230 could be substantially enhanced. As noted above, some axial flux motor designs forgo using cooling jackets and instead use protruding fins to transfer heat from the stator.

Figure 3:
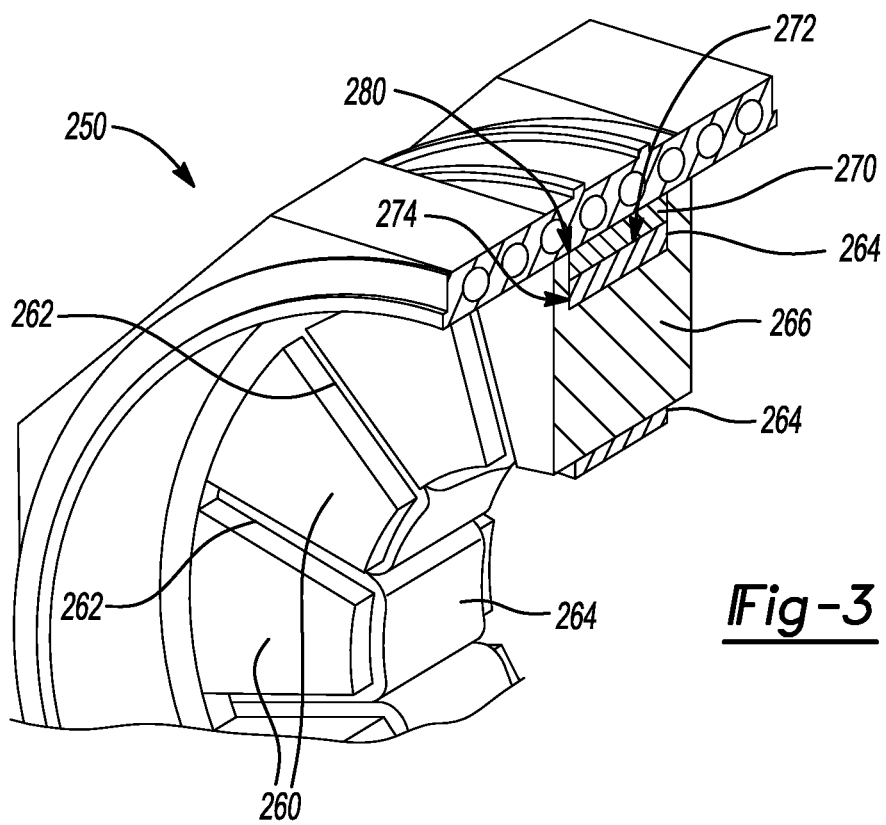
FIG. 3 is a partial sectional view of an axial flux motor stator assembly having a yokeless design including a modified magnetic portion formed of a molded soft magnetic composite that defines a peripheral contact surface having enhanced heat transfer capabilities for contacting a heat exchanger jacket prepared in accordance with certain aspects of the present disclosure.
Figure 4:
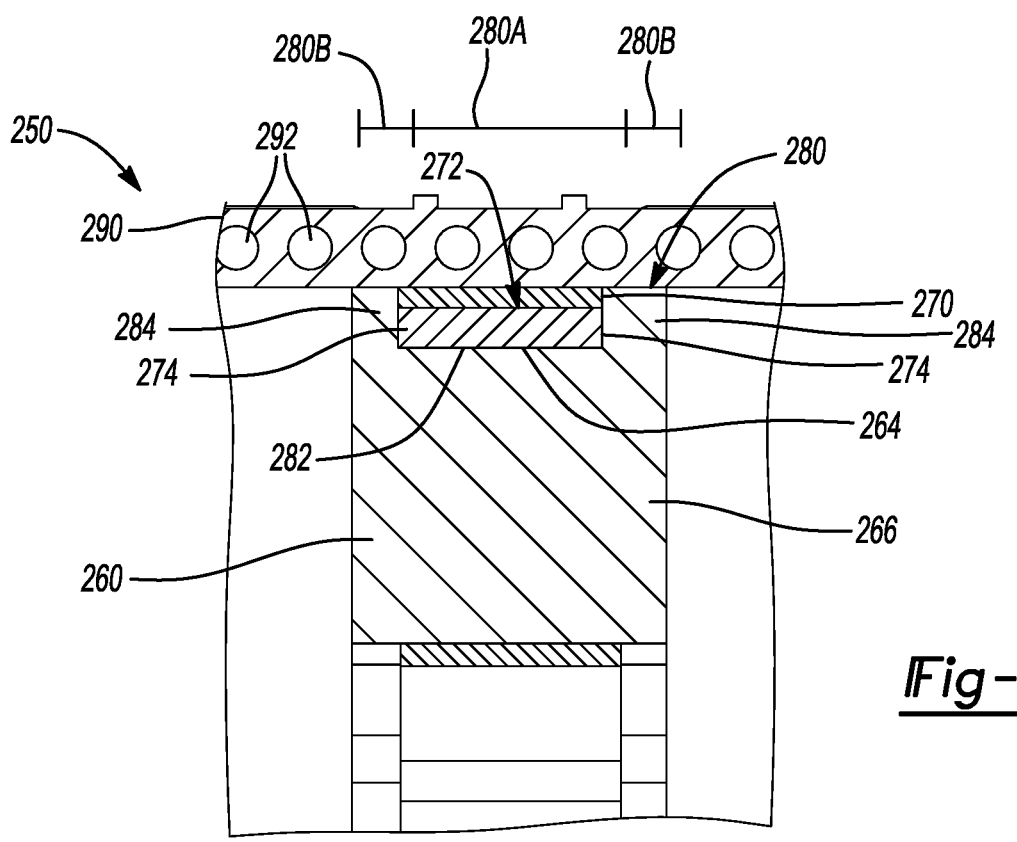
FIG. 4 is side sectional view of the axial flux motor stator assembly in FIG. 3.

FIGS. 3 and 4 shows an example of a stator 250 for an axial flux motor prepared in accordance with certain aspects of the present disclosure. Like the stator in FIG. 2, FIG. 3 shows a yokeless stator core design. The stator 250 includes a plurality of stator cores 260 physically separated by a plurality of channels or slots 262. Thus, the stator 250 is a yokeless design, because the plurality of stator cores 260 are separated from one another and not yoked together via physical connections. A plurality of electrically conductive wire windings 264 are wrapped around each respective stator core 260. Each stator core 260 defines a magnetic portion 266 that may define the central region of each stator core 260 and may be formed of a magnetic or ferromagnetic material. In accordance with certain aspects of the present disclosure, the magnetic portion 266 of each stator core 260 comprises a soft magnetic composite (SMC) material. SMC powders comprise a soft magnetic material, the surface of which may be covered with an electrically insulating layer.

In certain aspects, the precursor of the molded soft magnetic composite material includes particles defining a magnetic core surrounded by one or more insulation layers in a shell region. The magnetic material in the core may be ferromagnetic and comprise iron (e.g., iron or ferrite powder) or other magnetizable materials or alloys, including for example, iron alloys comprising silicon, nickel, and/or phosphorus, by way of example. Other examples include rare earth metal compounds, such as those comprising samarium (Sm), neodymium (Nd), like samarium cobalt (SmCo 1:5), samarium cobalt (SmCo 2:17), and neodymium iron boron (NdFeB). Other examples of suitable magnetic particles include aluminum nickel cobalt (AlNiCo) alloys. In certain aspects, an average particle diameter of the magnetic particles may be greater than or equal to about 50 micrometers to less than or equal to about 250 micrometers, and in certain aspects, optionally about 100 micrometers. The core region comprising the magnetic material may be surrounded by one or more insulation layers that is a non-magnetic material, such as a siloxane-based material, like a silicone varnish, or a metal-organic or inorganic insulating material, for example a silicate layer, an oxide layer, a phosphate layer, and equivalents and combinations thereof. In certain aspects, the insulating shell layer(s) may have a total thickness of greater than or equal to about 10 nm to less than or equal to about 1 mm and in certain aspects, optionally greater than or equal to about 10 nm to less than or equal to about 800 micrometers.

These powders are consolidated to form soft-magnetic components by means of pressing or consolidation. Thus, such an SMC material can be readily formed into a variety of different and complex shapes. A precursor of the soft magnetic composite material may include for example, ferromagnetic powder particles and optional matrix materials, like polymeric resin.

An electrically insulating material 270, such as an epoxy material, is disposed on and in contact with a peripheral side 272 of the electrically conductive wire windings 264. Other suitable electrically insulating materials are also contemplated, such as glass, porcelain or polymeric composite materials, for example, where a central region (e.g., rod) is made of fiber-reinforced plastic and an outer sheath comprises silicone rubber or ethylene propylene diene monomer rubber (EPDM). Thus, the electrically insulating material 270 may be selected from the group consisting of epoxy, glass, porcelain, siloxane-based silicone rubber, ethylene propylene diene monomer rubber (EPDM), composites, and combinations thereof.

However, the lateral sides 274 of the electrically conductive wire windings 264 may be adjacent to and optionally in contact with the SMC material forming the magnetic portion 266. Each stator core 260 defines a peripheral contact surface 280. In the embodiment shown in FIGS. 3 and 4, a portion of the peripheral contact surface 280 is defined by the SMC material of the magnetic portion 266. A second portion of the peripheral contact surface 280 is defined by the electrically insulating material 270. As shown, the electrically insulating material 270 occupies a central region 280A of the peripheral contact surface 280, while the SMC material in the magnetic portion 266 defines at least two outer regions 280B of the peripheral contact surface 280.

More specifically, as best seen in FIG. 4, the magnetic portion 266 comprising the SMC material is molded so as to define at least one central recessed region 282 configured to receive the electrically conductive wire windings 264. The electrically insulating material 270 is disposed on the electrically conductive wire windings 264 and the molded soft magnetic material of the magnetic portion 266 defines protruding flanges or walls 284 on either side of the at least one central recessed region 282.

The stator 250 also includes a heat exchanger jacket 290 configured to circulate a heat transfer fluid or liquid within a plurality of internally disposed channels 292. The heat exchanger jacket 290 is disposed circumferentially around at least a portion of a perimeter of the stator 250, more specifically around a portion of the plurality of stator cores 260. Thus, each peripheral contact surface 280 of each stator core 260 is in heat transfer relationship and in certain aspects, may be configured to contact the heat exchanger jacket 290. It should be noted that each of peripheral contact surfaces 280 does not necessarily need to contact the adjacent heat exchanger jacket 290, but rather each is adjacent to and in heat transfer relationship with the adjacent heat exchanger jacket 290, although physical contact can enhance heat transfer in certain variations.

The SMC material in the magnetic portion 266 has a high thermal conductivity. For example, an SMC material may have a thermal conductivity of greater than or equal to about 20 w/m·K, optionally greater than or equal to about 21 w/m·K, optionally greater than or equal to about 22 w/m·K, optionally greater than or equal to about 23 w/m·K, optionally greater than or equal to about 24 w/m·K, optionally greater than or equal to about 25 w/m·K, and in certain variations, optionally greater than or equal to about 26 w/m·K. By way of non-limiting example, an SMC material having a composition having iron powder particles coated with an electrically insulating layer has a thermal conductivity of about 26 w/m·K. In this manner, because a portion of the peripheral contact surface 280 (here outer regions 280B defined by the magnetic portion 266 formed of the SMC material) has a higher thermal conductivity, an amount of heat transferred from the plurality of stator cores 260 to the heat exchanger jacket 290 is substantially increased. By way of non-limiting example, the heat transfer may be increased by at least ten times and in certain aspects, increased by dozens of times.

It should also be noted that the amount of magnetic leakage that occurs by having a design as shown in FIGS. 3 and 4 is relatively minimal, for example, less than or equal to about 0.56% when accounting for total flux that occurs in the peripheral regions of the magnetic portion 266 like in flanges 284 extending adjacent to and peripherally to the electrically conductive wire windings 264 versus overall flux of the magnetic portion/entire stator core 260. It should be noted that in certain variations, the material disposed in the peripheral regions of the magnetic portion 266 may have different properties from a central region of the core, for example, a different density, permeability, or composition with differing amounts of components. In one embodiment, a first density of the magnetic portion/entire stator core 260 is greater than or equal to about 7.4 kg/m$^3$ and a second density in the edge regions including the flanges 284 is less than the first density, for example, greater than or equal to about 7.0 kg/m$^3$ to less than or equal to about 7.4 kg/m$^3$.

Figure 5:
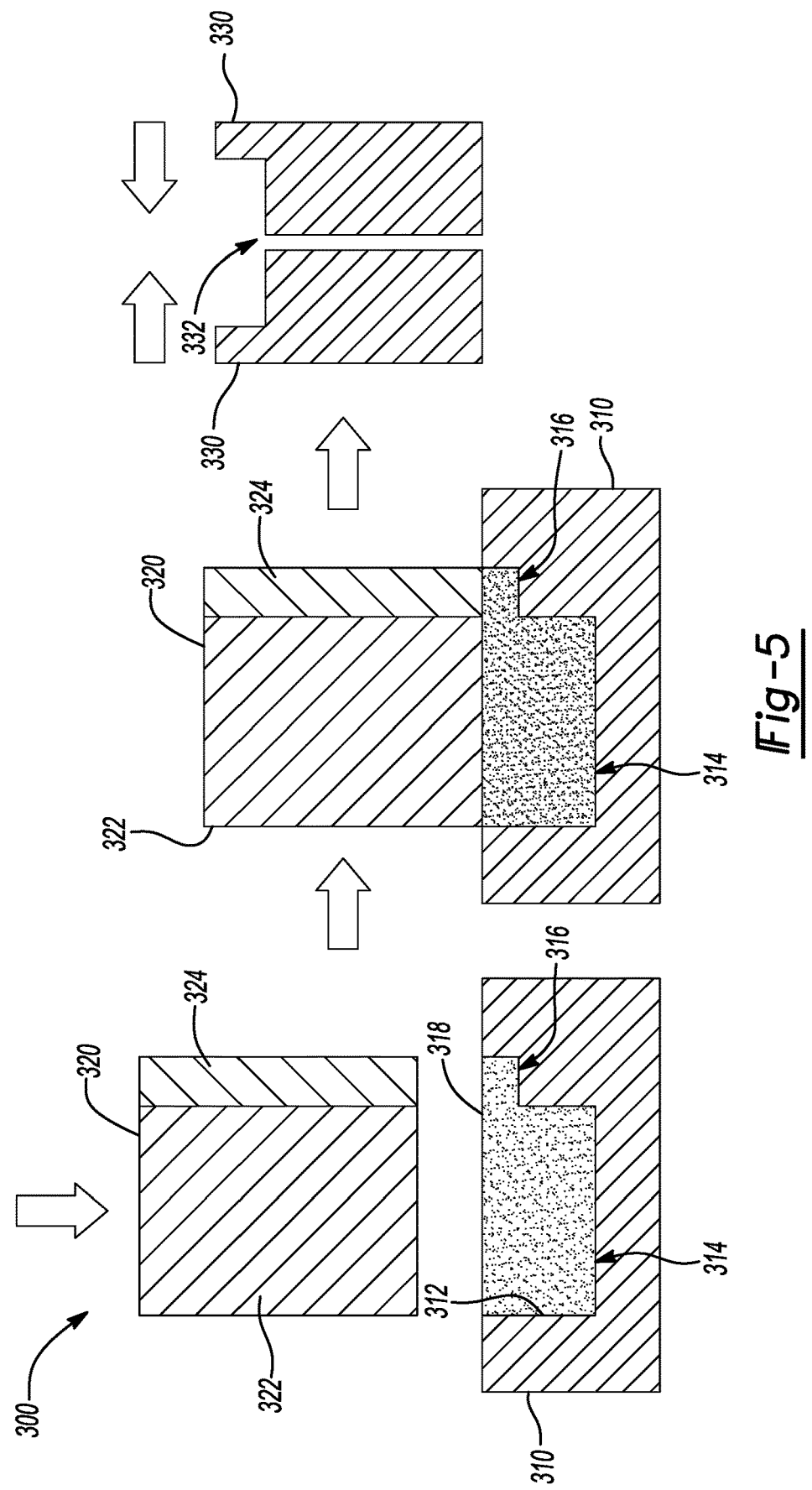
FIG. 5 shows a process for making a modified molded soft magnetic composite component having enhanced heat transfer capabilities for an axial flux motor assembly in accordance with certain aspects of the present disclosure.

FIG. 5 shows a representative formation process 300 for creating a magnetic portion of a stator core for a stator in axial flux motor like that shown in FIGS. 3 and 4. A mold 310 defines a cavity 312 having a shape corresponding to one-half of the magnetic portion of a stator core. The cavity 312 defines a first region 314 that corresponds to a center of a stator core and a second region 316 that corresponds to an outer region or flange that defines a portion of a peripheral contact surface of the stator core. The first region 314 is thus deeper and has a greater volume than the second region 316. The cavity 312 is filled with an SMC material precursor 318, for example, a plurality of magnetic or ferromagnetic particles. Resin powder or another polymeric precursor may also be introduced into the cavity 312. The resin and particles may be premixed to form a homogeneous mixture. While not shown, equipment for automatically conveying and introducing the SMC material precursor 318 may be associated with the mold 310, as recognized by those of skill in the art.

The SMC material precursor 318 may be densified, for example, by applying compressive force to the mold 310. A press 320 may include multiple components, namely a first press head 322 and a second press head 324. In accordance with certain aspects of the present disclosure, the first press head 322 may apply compressive force at a different level than the second press head 324, resulting in different levels of densification of the SMC material precursor 318. For example, the first press head 322 may apply a first pressure of greater than or equal to about 800 MPa in the first region 314 of the mold cavity 312. The second press head 324 may apply a second pressure to the SMC precursor material 318 in the second region 316 that is less than the first pressure. For example, the second pressure may be greater than or equal to about 300 MPa to less than or equal to about 600 MPa. As noted above, after the pressing process, a first density in the first region 314 is greater than or equal to about 7.4 kg/m$^3$, while a second density in the second region 316 is less than the first density, for example, greater than or equal to about 7.0 kg/m$^3$ to less than or equal to about 7.4 kg/m$^3$. It should also be noted that in certain variations, the material composition in the first region 314 may be different from the material composition in the second region 316, for example, having a lower amount of magnetic components in the second region 316 versus the first region 314. Additionally, different product series can be compressed by different sizes of powder particles, where the different product series each have different flux permeability.

While not shown, as necessary, additional equipment for applying heat and/or actinic radiation may be used to react the SMC composite matrix, for example, polymerizing or cross-linking. The formation process 300 may be repeated to form two solid densified SMC material components 330. The two solid densified SMC material components 330 can then be joined together to form a magnetic portion. In certain variations, to enhance adhesion solid densified SMC material components 330, an adhesive or glue may be further employed at the interface therebetween to form the magnetic portion of a stator core (see magnetic portion 266 of stator cores 210 in FIGS. 3 and 4). While not shown, electrically conductive wire windings may then be wrapped around each stator core (for example, in a recessed region 332 formed when the solid densified SMC material components 330 are joined together) and then an electrically insulating material may be disposed or molded over the electrically conductive windings (not shown in FIG. 5). These formation steps may be conducted in an automated process.

Figure 6:
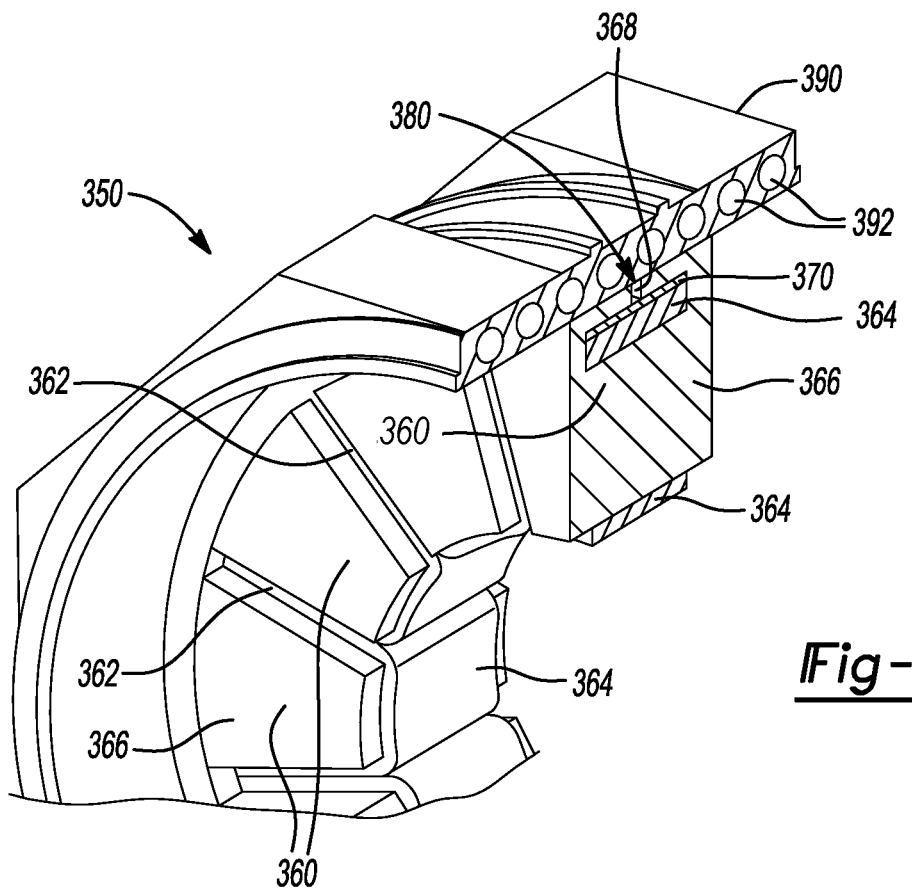
FIG. 6 is a partial sectional view of an axial flux motor stator assembly having a yokeless design including another variation of a modified magnetic portion formed of a molded soft magnetic composite that defines a peripheral contact surface having enhanced heat transfer capabilities for contacting a heat exchanger jacket prepared in accordance with certain aspects of the present disclosure.
Figure 7:
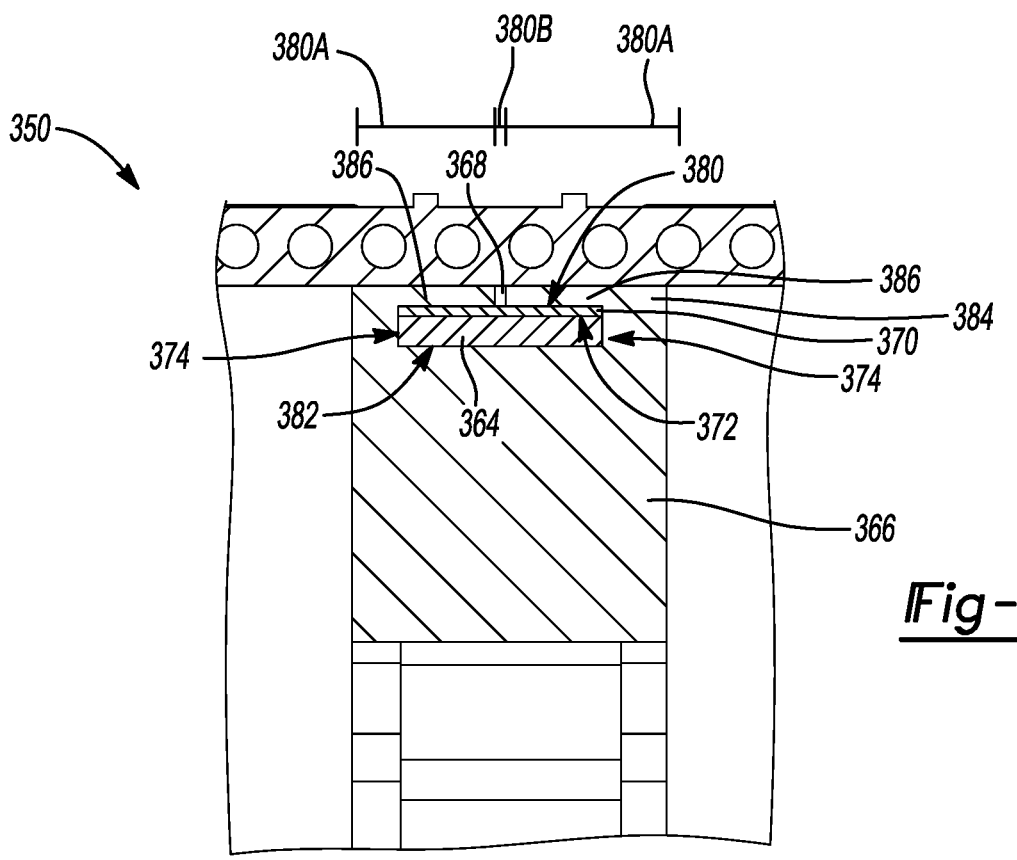
FIG. 7 is side sectional view of the axial flux motor stator assembly in FIG. 6.

FIGS. 6 and 7 show an example of a stator 350 for an axial flux motor prepared in accordance with certain aspects of the present disclosure. FIGS. 6-7 show another yokeless stator core design. The stator 350 includes a plurality of stator cores 360 physically separated by a plurality of channels or slots 362. Thus, the stator 350 is a yokeless design, because the plurality of stator cores 360 are separated from one another and not yoked together via physical connections. A plurality of electrically conductive wire windings 364 are wrapped around each respective stator core 360. Each stator core 360 defines a magnetic portion 366 that may define the main or central region of each stator core 360 and may be formed of a magnetic or ferromagnetic material. In accordance with certain aspects of the present disclosure, the magnetic portion 366 of each stator core 360 comprises a soft magnetic composite (SMC) material, as described previously above.

An electrically insulating material 370, such as an epoxy material, is disposed on and in contact with a peripheral side 372 of the electrically conductive wire windings 364 to provide electrical isolation of the windings. However, the lateral sides 374 of the electrically conductive wire windings 364 may be adjacent to and optionally in contact with the SMC material forming the magnetic portion 366. Each stator core 360 defines a peripheral contact surface 380. In the embodiment shown in FIGS. 6 and 7, a first portion 380A of the peripheral contact surface 380 is defined by the SMC material of the magnetic portion 366. More specifically, the regions of the peripheral contact surface 380 for establishing contact with an adjacent component are defined by the magnetic portion, but there is a gap 380B defined in the peripheral contact surface 380. As shown, the gap 380B is on the peripheral contact surface 380. The optional gap 380B can be used to reduce magnetic flux leakage at the peripheral contact surface 380. In certain variations, the dimensions of the gap are greater than an airgap ($h_g$) defined between the stator and adjacent rotor.

The magnetic portion 366 comprising the SMC material is molded so as to define at least one central recessed region 382 configured to receive the electrically conductive wire windings 364. The electrically insulating material 370 is disposed on the electrically conductive wire windings 364 and the molded soft magnetic material of the magnetic portion 366 defines protruding walls 384 on either side of the at least one central recessed region 382 that are integrally connected with covered regions 386 that extend over a portion of the central recessed region 382. In this manner, the magnetic portion 366 defines a central recessed region with sides having a cross-sectional L-shape that define a gap 368 there between. The electrically conductive wire windings 364 and the electrically insulating material 370 are thus seated within the central recessed region 382 defined by the magnetic region. The magnetic region that extends over the electrically conductive wire windings 364 and the electrically insulating material may have a thickness of greater than or equal to about 3 mm to less than or equal to about 10 mm. The gap 368 has a length that is greater than an axial length of an airgap, so that a length of the gap 368 may be greater than or equal to about 2 mm to less than or equal to about 20 mm. The presence of the gap 368 can minimize the flux leakage in the path through the covered regions 386. As such, the covered regions 386 of magnetic portion 366 of the stator core 360 covers both the top and bottom surfaces of the electrically conductive wire windings 364 (with the electrically insulating material 370 disposed on one side of the electrically conductive wire windings 364). In certain variations, the magnetic portion 366 formed of an SMC material can be overmolded around the insulated coils (electrically conductive wire windings 364).

The stator 350 also includes a heat exchanger jacket 390 configured to circulate a heat transfer fluid or liquid within a plurality of internally disposed channels 392. The heat exchanger jacket 390 is disposed circumferentially around at least a portion of a perimeter of the stator 350, more specifically around a portion of the plurality of stator cores 360. Thus, each peripheral contact surface 380 of each stator core 360 is in heat transfer relationship and in certain aspects, configured to contact the heat exchanger jacket 390. As previously described above, the SMC material in the magnetic portion 366 has a high thermal conductivity. Thus, because most of the peripheral contact surface 380 (here first portions 380A defined by the magnetic portion 366 formed of the SMC material) has a higher thermal conductivity than an electrically insulating material, an amount of heat transferred from the plurality of stator cores 360 to the heat exchanger jacket 390 is substantially increased. By way of non-limiting example, the heat transfer may be increased by at least ten times and in certain aspects, increased by dozens of times. It should also be noted that the amount of magnetic leakage that occurs by having a design as shown in FIGS. 6 and 7 is relatively minimal, for example, less than or equal to about 0.3%, when accounting for total flux that occurs in the peripheral regions of the magnetic portion 366 like in walls 384 and covered regions 386 extending adjacent to and over the electrically conductive wire windings 364 versus overall flux of the magnetic portion/entire stator core 360. As noted above, it should be noted that in certain variations, the material disposed in the peripheral regions of the magnetic portion 366 may have different properties from a central region of the core, for example, a different density, permeability, or composition with differing amounts of components.

Figure 8:
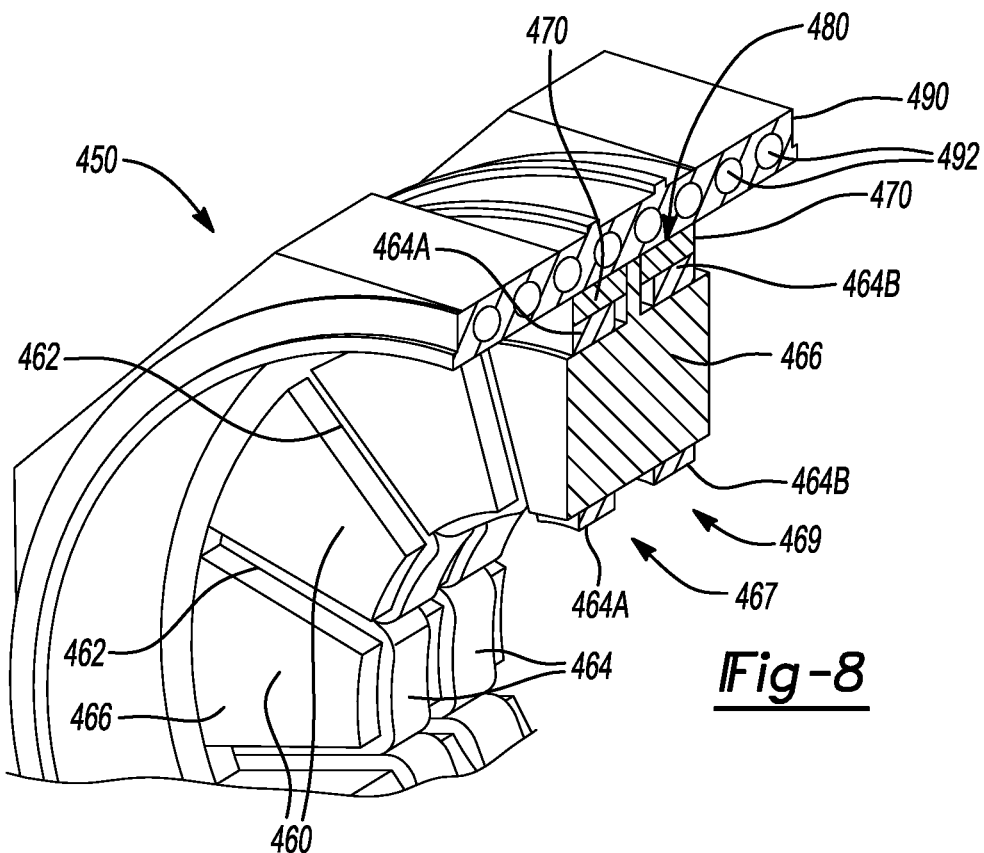
FIG. 8 is a partial sectional view of an axial flux motor stator assembly having a yoked design including another variation of a modified magnetic portion that defines a centrally disposed protrusion that defines a portion of a peripheral contact surface having enhanced heat transfer capabilities for contacting a heat exchanger jacket prepared in accordance with certain aspects of the present disclosure.
Figure 9:
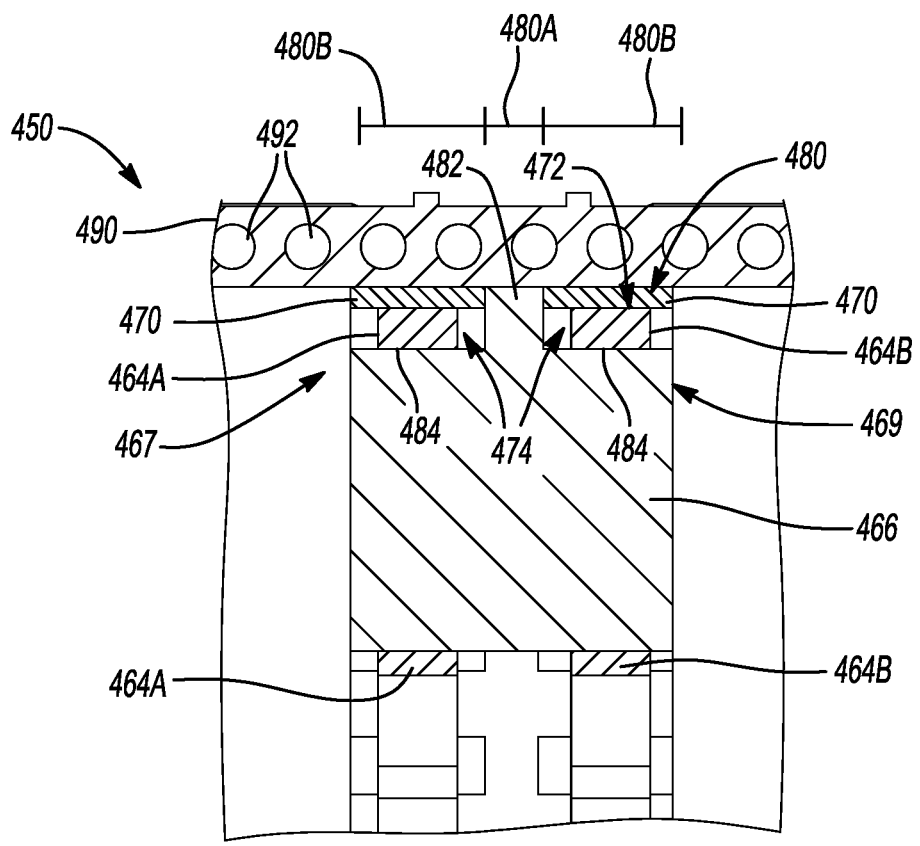
FIG. 9 is side sectional view of the axial flux motor stator assembly in FIG. 8.

FIGS. 8 and 9 show an example of yet another stator 450 for an axial flux motor prepared in accordance with certain aspects of the present disclosure. FIGS. 8 and 9 show a yoked stator core design. The stator 450 includes a plurality of stator cores 460 partially separated by a plurality of channels or slots 462. However, as will be described further here, the plurality of stator cores 460 is also physically connected in at least one region with one another or yoked together.

A plurality of electrically conductive wire windings 464 are wrapped around each respective stator core 460. Each stator core 460 defines a magnetic portion 466 that may define the main or central region of each stator core 460 and may be formed of a magnetic or ferromagnetic material. In accordance with certain aspects of the present disclosure, the magnetic portion 466 of each stator core 460 comprises a magnetic or ferromagnetic material. The magnetic or ferromagnetic material may be a molded magnetic composite (SMC) material, as described previously above. Alternatively, the magnetic or ferromagnetic material may include a laminated stator core component having a plurality of layers of ferromagnetic material, such as magnetic steel. Such ferromagnetic material layers are typically isolated from one another by an insulating material interleaved therebetween. The laminated steel sheets may be punched, optionally annealed, and stacked in manufacturing process to form a laminated stator core component. When multiple laminated stator core components are assembled together, they form a plurality of magnetizable poles.

As shown, the plurality of electrically conductive wire windings 464 are distributed onto two sides of each respective stator core 460. Thus, a first side 467 of the stator core 460 has a first plurality of electrically conductive wire windings 464A. A second side 469 of the stator core 460 has a second plurality of core components 464B.

An electrically insulating material 470, such as an epoxy material, is disposed on and in contact with a peripheral side 472 of the electrically conductive wire windings 464. However, the lateral sides 474 of the electrically conductive wire windings 464 may be adjacent to and optionally in contact with the SMC material forming the magnetic portion 466.

The magnetic portion 466 comprising the SMC material is molded to define at least one central protruding region 482. The molded soft magnetic material of the magnetic portion 466 further defines two seat regions 484 on either side of the at least one central protruding regions 482. The two seat regions 484 are configured to receive the electrically conductive wire windings 464. The electrically conductive wire windings 464 and the electrically insulating material 470 are thus seated within the two seat regions 484 defined by the magnetic region. The at least one protruding region 482 has a rectangular shape and extends radially outwards towards a periphery of the stator 450. The protruding region may have an axial length of greater than or equal to about 3 mm to less than or equal to about 20 mm. As noted above, the at least one protruding region 482 of the magnetic portion 466 may be a flange that continuously extends over and connects each of the plurality of stator cores 460 to yoke them together.

Each stator core 460 thus defines a peripheral contact surface 480. In the embodiment shown in FIGS. 8 and 9, a first portion of the peripheral contact surface 480A is defined by the magnetic material of the magnetic portion 466 corresponding to the at least one central protruding region 482. A second portion 480B of the peripheral contact surface 480 is defined by the electrically insulating material 470. As shown, the electrically insulating material 470 occupies outward regions or second portion 480B of the peripheral contact surface 480, while the SMC material in the magnetic portion 466 defines the central first portion 480A of the peripheral contact surface 480. The central first portion 480A of the peripheral contact surface 480 may be formed of the magnetic or ferromagnetic material of the magnetic portion 466, which as described above, may be an SMC material or the laminated magnetic steel layers. By way of non-limiting example, the laminated magnetic steel material may have a thermal conductivity of greater than or equal to about 30 W/m·K to less than or equal to about 50 W/m·K. Thus, the first portion 480A of the peripheral contact surface 480 has a higher thermal conductivity than the surrounding second portion 480B formed of the electrically insulating material 470. The stator 450 also includes a heat exchanger jacket 490 configured to circulate a heat transfer fluid or liquid within a plurality of internally disposed channels 492. The heat exchanger jacket 490 is disposed circumferentially around at least a portion of a perimeter of the stator 450, more specifically around a portion of the plurality of stator cores 460. Thus, each peripheral contact surface 480 of each stator core 460 is in heat transfer relationship and in certain aspects, may be configured to contact the heat exchanger jacket 490. As previously described above, the SMC material or laminated magnetic steel in the magnetic portion 466 has a relatively high thermal conductivity. Thus, the presence of the first portion 480A in the peripheral contact surface 480 defined by the magnetic portion 466 has a higher thermal conductivity than an electrically insulating material 470, such that an amount of heat transferred from the plurality of stator cores 460 to the heat exchanger jacket 490 is enhanced. Again, by way of non-limiting example, the heat transfer may be increased by at least ten times and in certain aspects, increased by dozens of times.

It should also be noted that the amount of magnetic leakage that occurs by having a design as shown in FIGS. 8 and 9 is relatively minimal, for example, less than or equal to about 0.5%, when accounting for total flux that occurs in the central protruding regions of the magnetic portion 466 extending adjacent to and past the electrically conductive wire windings 464 versus overall flux of the magnetic portion/entire stator core 460. As discussed above, in certain variations, the material disposed in the at least one protruding region 482 of the magnetic portion 466 may have different properties from a central region of the core, for example a lower density or a distinct composition with differing amounts of magnetic components. In various aspects, the present disclosure thus provides stators for axial flux motors, including both yokeless and yoke type stator designs, which can enable direct contact of the heat generating or magnetic portions of the stator with a heat exchanger (e.g., water jacket).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A stator assembly for an axial flux motor comprising:
   a heat exchanger jacket configured to circulate a heat transfer liquid; and
   a stator comprising a plurality of stator cores each comprising:
      a conductive winding;
      an electrically insulating material disposed over at least a portion of the conductive winding; and
      a molded soft magnetic composite (SMC) material;
   wherein the heat exchanger jacket is disposed circumferentially around at least a portion of a perimeter of the stator, wherein each stator core defines a peripheral surface configured to contact the heat exchanger jacket and at least a portion of the peripheral surface is defined by the molded soft magnetic (SMC) material.

2. The stator assembly of claim 1, wherein a first portion of the peripheral surface is defined by the molded soft magnetic (SMC) material and a second portion of the peripheral surface is defined by the electrically insulating material.

3. The stator assembly of claim 2, wherein the second portion is a central region of the peripheral surface and the first portion defines at least two outer regions of the peripheral surface.

4. The stator assembly of claim 3, wherein the molded soft magnetic (SMC) material defines at least one central recessed region configured to receive the conductive winding, wherein the electrically insulating material is disposed on the conductive winding and the molded soft magnetic (SMC) material defines protruding flanges on either side of the at least one central recessed region.

5. The stator assembly of claim 2, wherein the first portion is a central region of the peripheral surface and the second portion defines at least two outer regions of the peripheral surface.

6. The stator assembly of claim 5, wherein the molded soft magnetic (SMC) material extends between adjacent stator cores of the plurality of stator cores and the stator has a yoked design.

7. The stator assembly of claim 1, wherein the peripheral surface is defined by the molded soft magnetic (SMC) material having a gap disposed therein.

8. The stator assembly of claim 7, wherein the gap is centrally disposed within the peripheral surface.

9. The stator assembly of claim 7, wherein the molded soft magnetic (SMC) material defines a recess beneath the peripheral surface that receives the conductive winding and the electrically insulating material disposed therein.

10. The stator assembly of claim 1, wherein the plurality of stator cores are physically separated from one another and the stator has a yokeless design.

11. The stator assembly of claim 1, wherein the molded soft magnetic (SMC) material defines a core having at least one recessed region configured to receive the conductive winding and the electrically insulating material disposed thereon.

12. The stator assembly of claim 1, wherein the molded soft magnetic (SMC) material has a first density in a central region of greater than or equal to about 7.4 kg/m$^3$ and the molded soft magnetic (SMC) material at the peripheral surface has a second density of greater than or equal to about 7.0 kg/m$^3$ to less than or equal to about 7.4 kg/m$^3$.

13. The stator assembly of claim 1, wherein the molded soft magnetic composite (SMC) material a plurality of magnetic particles comprising iron.

14. The stator assembly of claim 1, wherein the electrically insulating material is selected from the group consisting of epoxy, glass, porcelain, silicone rubber, ethylene propylene diene monomer rubber (EPDM), composites, and combinations thereof.

15. An axial flux motor comprising:
   the stator assembly of claim 1; and
   at least one rotor comprising a plurality of magnets and an air gap is defined between the stator and the at least one rotor.

16. A method of making a stator core component for an axial flux motor comprising:
   introducing a soft magnetic composite material (SMC) precursor into a cavity of a mold comprising a first region and a second region, wherein the soft magnetic composite material (SMC) precursor comprises a polymer precursor and a plurality of magnetic or ferromagnetic particles; and
   compressing the soft magnetic composite material (SMC) precursor in the cavity by concurrently applying a first pressure of greater than or equal to about 800 MPa from a first press head in the first region and a second pressure of greater than or equal to about 300 MPa to less than or equal to about 600 MPa from a second press head in the second region; and
   removing a consolidated soft magnetic composite (SMC) material component from the cavity having a first density corresponding to the first region where the first pressure is applied and a second density corresponding to the second region where the second pressure is applied.

17. The method of claim 16, wherein two of the consolidated soft magnetic composite (SMC) material component are joined together to form a stator core and the method further comprises applying a conductive winding around the stator core and disposing an electrically insulating material over at least a portion of the conductive winding.

18. The method of claim 16, wherein the plurality of magnetic or ferromagnetic particles comprises a core of a magnetic or ferromagnetic material surrounded by a shell comprising one or more insulation layers, wherein the magnetic or ferromagnetic material comprises a material selected from the group consisting of: iron, samarium, neodymium, cobalt, aluminum, alloys and combinations thereof.

19. The method of claim 16, wherein the first density is greater than or equal to about 7.4 kg/m$^3$ and the second density is greater than or equal to about 7.0 kg/m$^3$ to less than or equal to about 7.4 kg/m$^3$.

20. A stator assembly for a yoked axial flux motor comprising:
- a heat exchanger jacket configured to circulate a heat transfer liquid; and
- a stator comprising a plurality of stator cores each comprising:
  - a conductive winding;
  - an electrically insulating material disposed over at least a portion of the conductive winding; and
  - a magnetic region comprising a molded soft magnetic composite (SMC) material or a plurality of laminated magnetic steel layers, wherein the magnetic region comprises a centrally protruding portion that extends between and connects the plurality of stator cores;
- wherein the heat exchanger jacket is disposed circumferentially around at least a portion of a perimeter of the stator, wherein each stator core defines a peripheral surface configured to contact the heat exchanger jacket and at least a portion of the peripheral surface is defined by the magnetic region.

* * * * *